Figure 1:
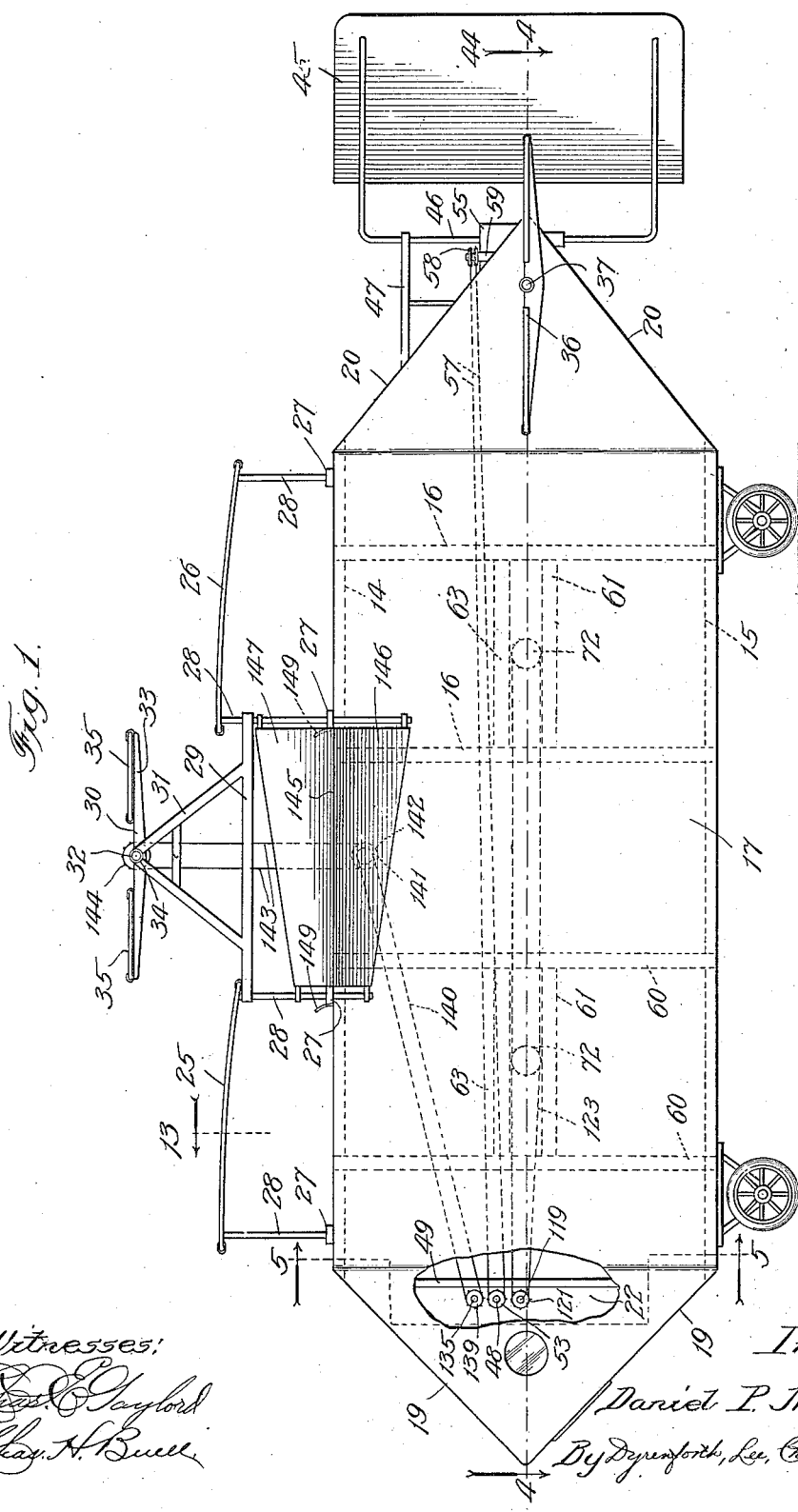

D. P. McLAUGHLIN.
FLYING MACHINE OR AIRSHIP.
APPLICATION FILED OCT. 13, 1911.

1,048,990.

Patented Dec. 31, 1912.
8 SHEETS—SHEET 2.

Witnesses:
Inventor:
Daniel P. McLaughlin,
By Dyrenforth, Lee, Chritton and Wiles,
Attys.

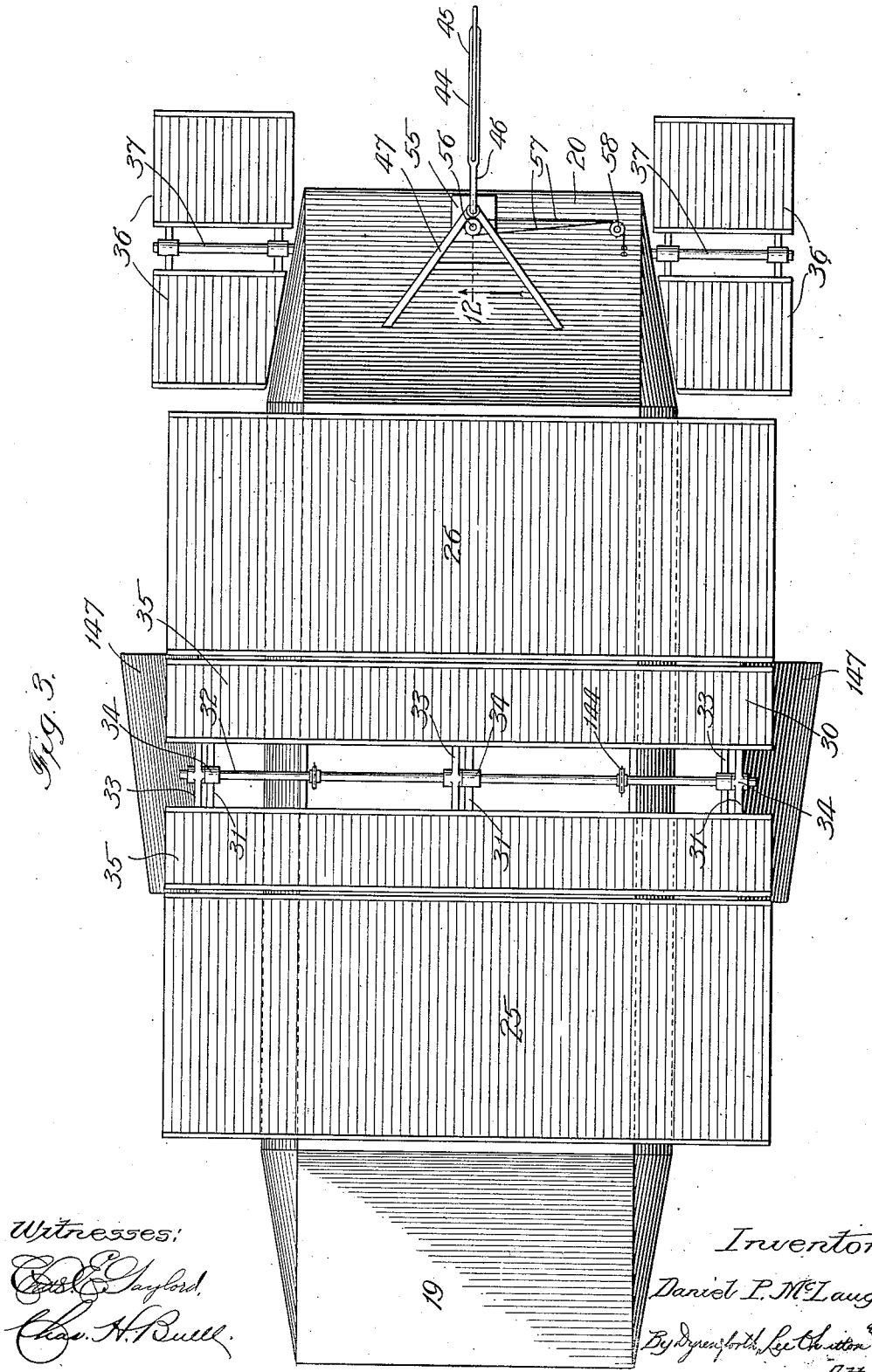

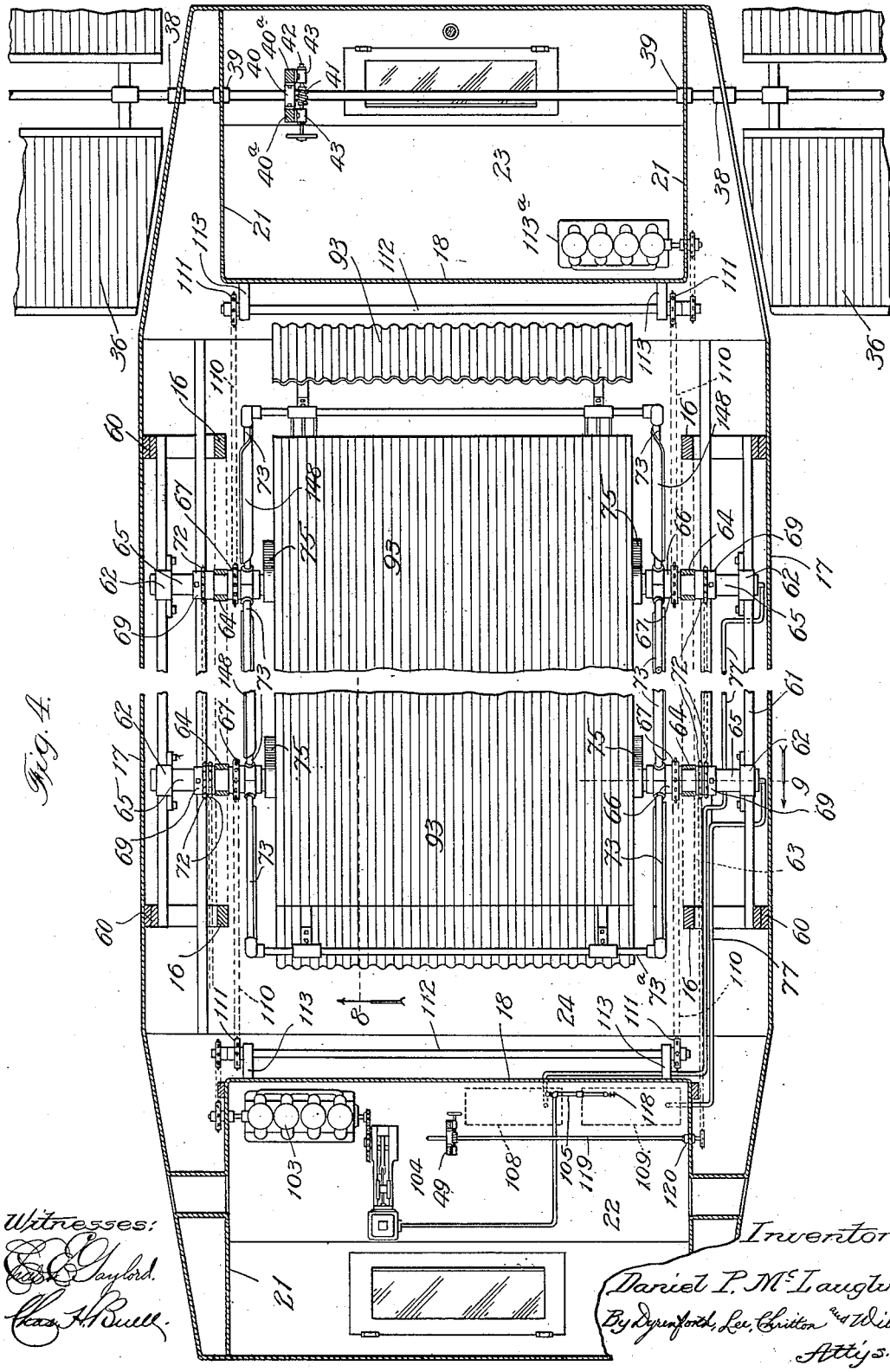

D. P. McLAUGHLIN.
FLYING MACHINE OR AIRSHIP.
APPLICATION FILED OCT. 13, 1911.
1,048,990.
Patented Dec. 31, 1912.
8 SHEETS—SHEET 5.
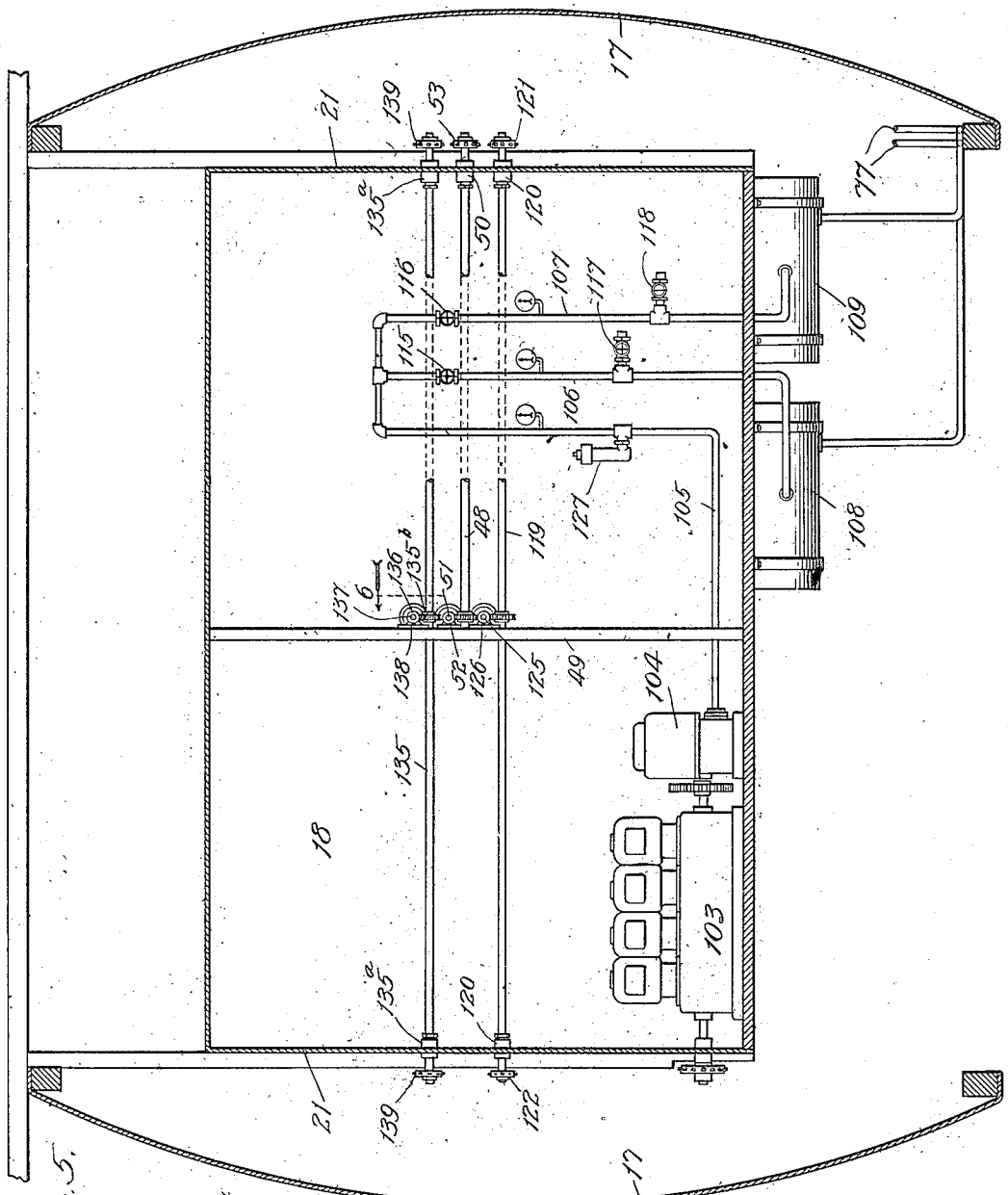
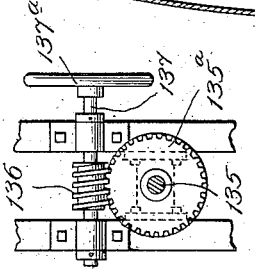
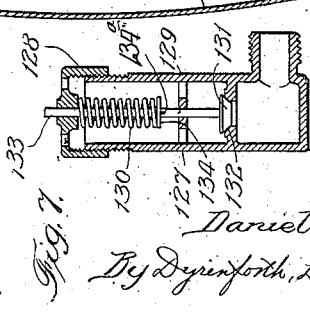
Witnesses:
Inventor:
Daniel P. McLaughlin
By Dyrenforth, Lee, Chritton and Wiles,
Attys.

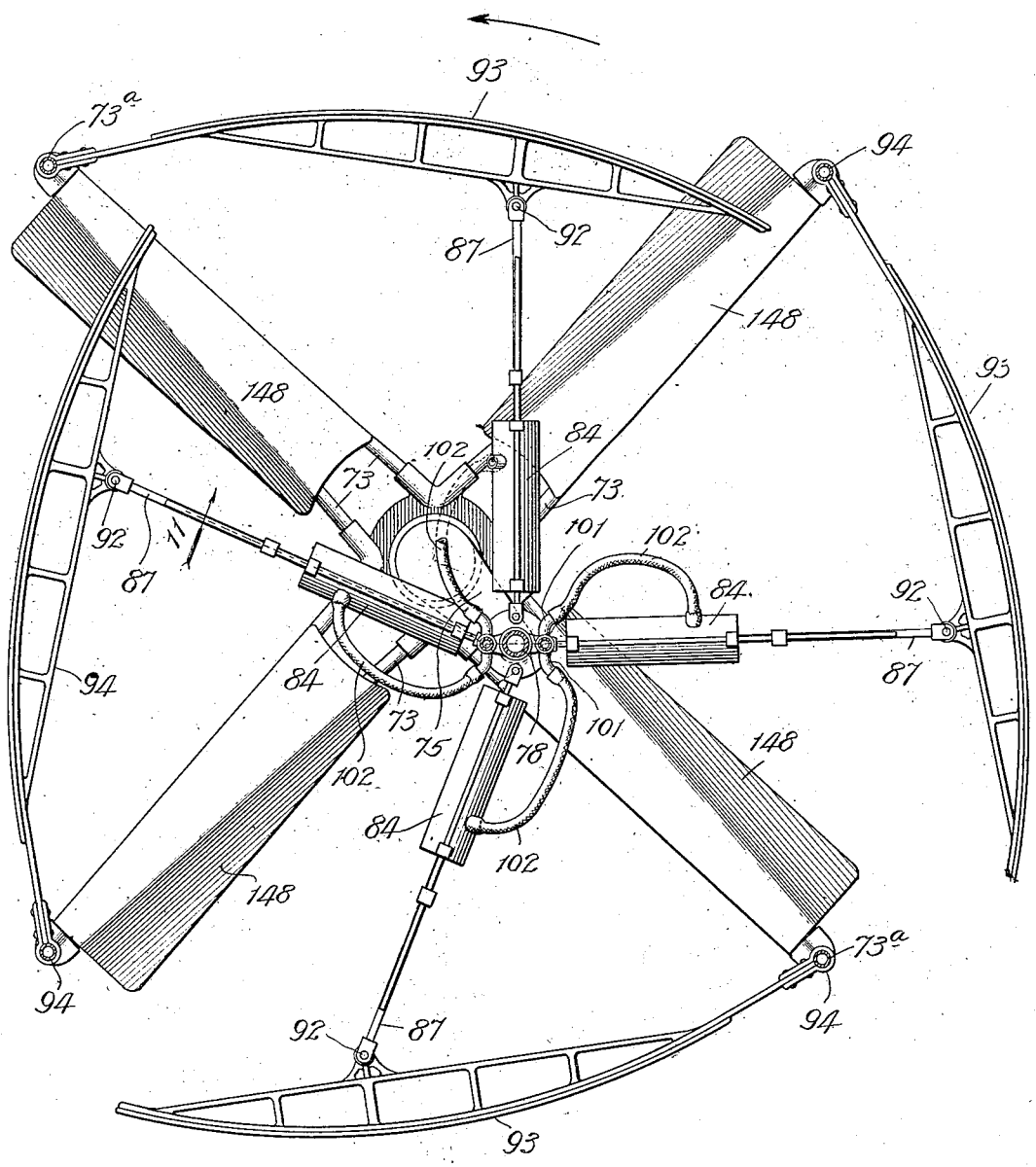

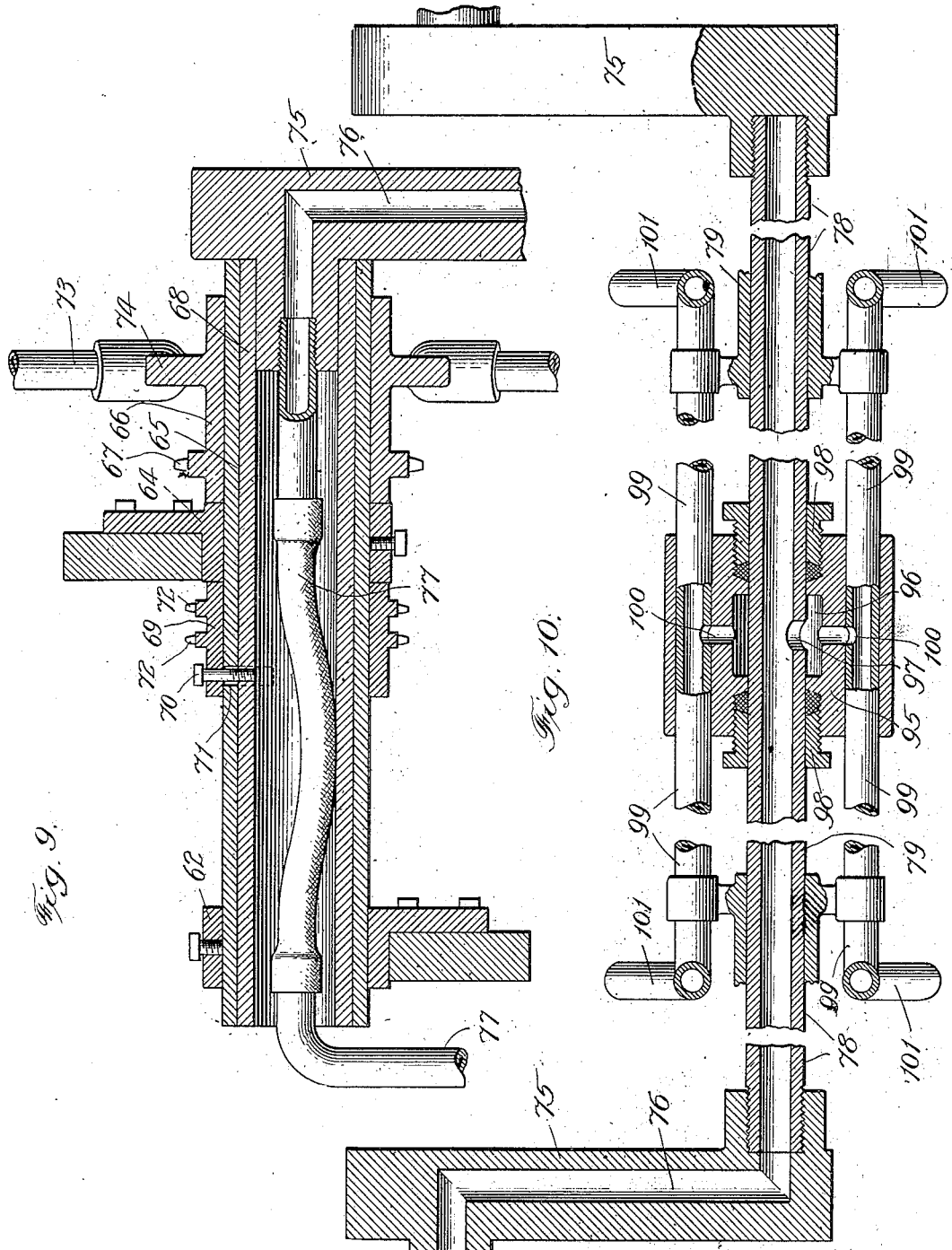

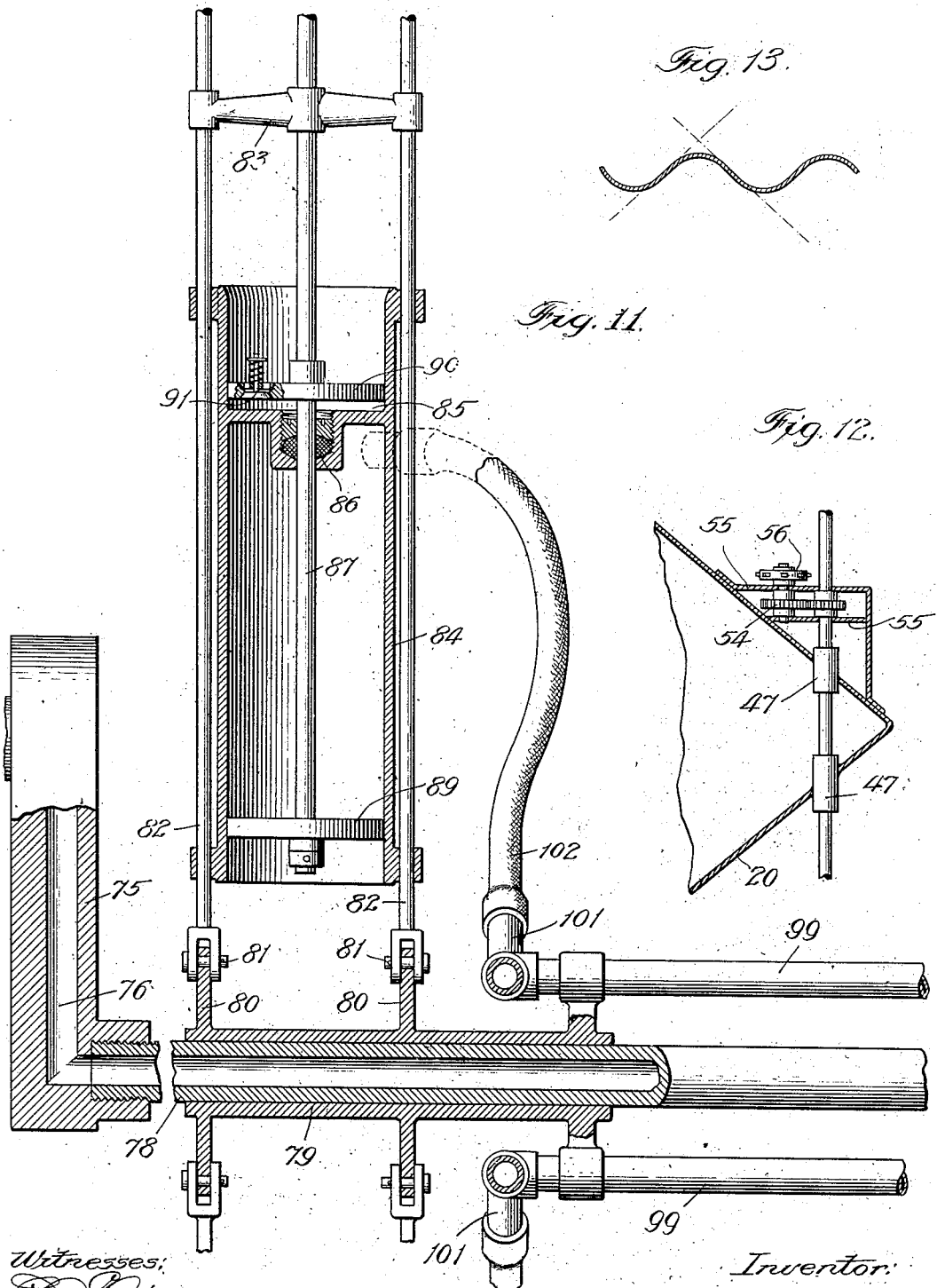

UNITED STATES PATENT OFFICE.

DANIEL P. McLAUGHLIN, OF CHICAGO, ILLINOIS.

FLYING-MACHINE OR AIRSHIP.

1,048,990. Specification of Letters Patent. Patented Dec. 31, 1912.

Application filed October 13, 1911. Serial No. 654,482.

*To all whom it may concern:*

Be it known that I, DANIEL P. McLAUGHLIN, a citizen of the United States, residing at Chicago, in the county of Cook and State of Illinois, have invented a new and useful Improvement in Flying-Machines or Airships, of which the following is a specification.

My invention relates to improvements in flying-machines or airships equipped with propelling means for driving the ship, and, more particularly, to the type of machines commonly known as "heavier than air" machines, certain features of my invention constituting improvements upon the invention forming the subject of United States Letters Patent No. 991,794, granted to me on May 9, 1911, for improvements in flying machines or air-ships.

I have employed in my present construction the principle upon which the construction forming the subject of said Letters Patent operates, namely that of utilizing the resistance of the ship to movement for storing power generated by the air-engaging devices, namely the propellers or their equivalent mechanism, in their operation against the air, and automatically exerting said stored up power upon the body of the ship to overcome the resistance thereof and propel or lift the ship, or both, depending upon the positioning of the propelling mechanism; and as to this feature my object, by the present invention, is to obtain the maximum efficiency of the propelling mechanism; and to provide for the controlling of the degree of power stored in the operation of the propeller against the air and in opposition to the resistance afforded by the ship, whereby the speed of movement of the ship in ascending or descending, or being otherwise propelled, may be controlled.

Further objects are to provide for the automatic righting of the ship in the event of tilting thereof to maintain it on an even, or substantially even keel; to provide air-engaging surfaces for the ship which in moving against the air operate to produce either the raising or otherwise driving action, in such a form as to cause them to operate with the maximum efficiency; and, generally, to provide improvements to the end of rendering the ship readily controllable and positive in its operation, in rising, descending or in otherwise moving through the air.

Figure 2:
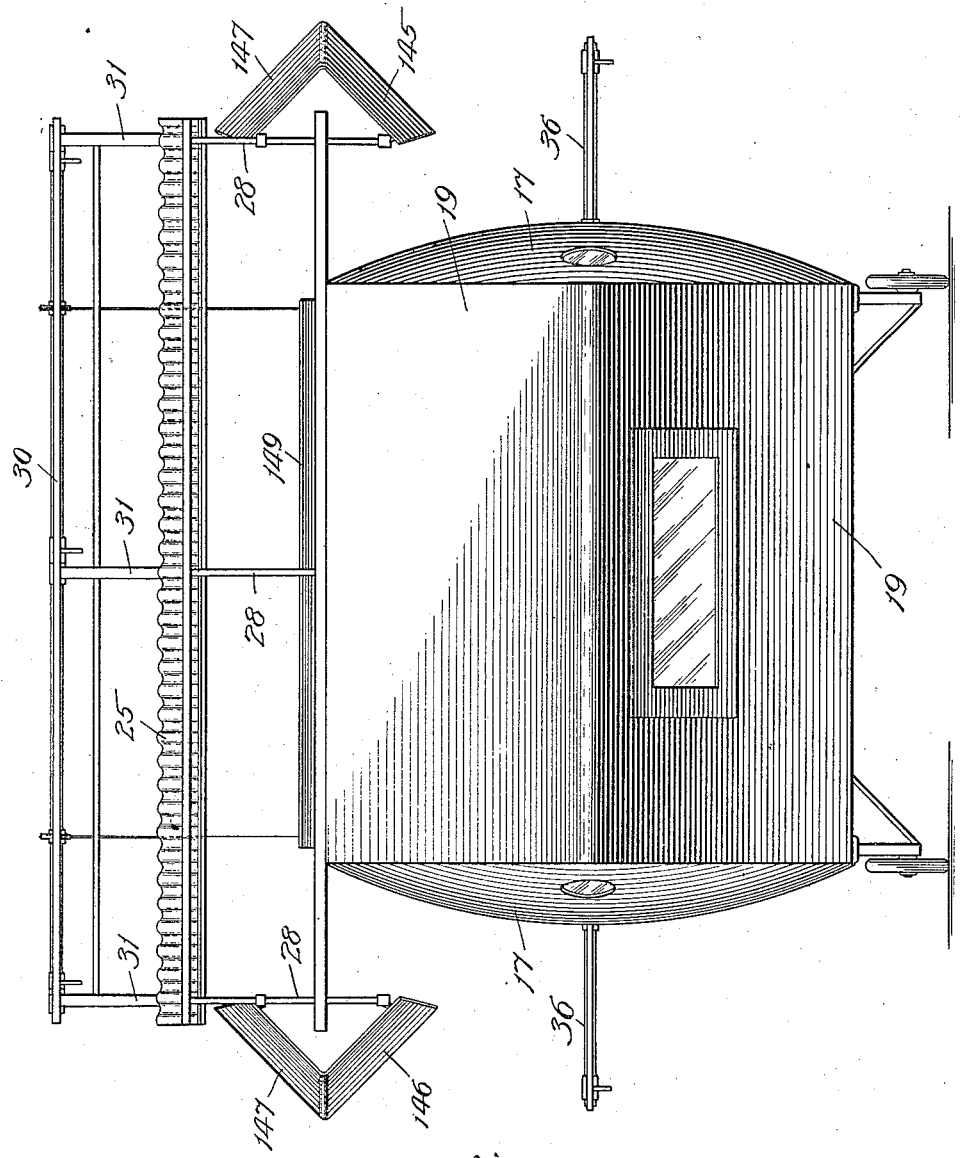

Referring to the accompanying drawings—Figure 1 is a view in side elevation of an airship constructed in accordance with my invention, a portion of the wall of the compartment at the prow thereof being broken away to disclose interior details. Fig. 2 is an end view of the front of the machine. Fig. 3 is a plan view thereof. Fig. 4 is a section taken at the line 4 on Fig. 1 and viewed in the direction of the arrow. Fig. 5 is an enlarged section taken at the irregular line 5 on Fig. 1 and viewed in the direction of the arrow. Fig. 6 is an enlarged section taken at the line 6 on Fig. 5 and viewed in the direction of the arrow. Fig. 7 is an enlarged view, in sectional elevation, of a relief-valve which I prefer to employ in connection with the fluid-pressure producing means for maintaining the desired pressure in the pipe which leads to the tanks supplied with fluid-pressure therefrom, and from which tanks the propelling mechanism of the ship is supplied with fluid-pressure. Fig. 8 is an enlarged section taken at the line 8 on Fig. 4 and viewed in the direction of the arrow, the driving mechanism therein disclosed being shown in the position it assumes when at rest. Fig. 9 is an enlarged broken section taken at the line 9 on Fig. 4 and viewed in the direction of the arrow. Fig. 10 is a broken longitudinal sectional view of a portion of the fluid-pressure connections between the source of fluid-pressure and the piston and cylinder mechanisms with which the driving means are equipped. Fig. 11 is an enlarged section taken at the line 11 on Fig. 8 and viewed in the direction of the arrow. Fig. 12 is an enlarged section taken at the line 12 on Fig. 3 and viewed in the direction of the arrow; and Fig. 13, an enlarged section taken at the line 13 on Fig. 1 and viewed in the direction of the arrow.

In the illustrated, preferred, embodiment of my invention the body of the ship is formed of a frame comprising upper and lower longitudinally-extending girders 14 and 15, and uprights 16 connecting the girders together; side walls 17 spaced apart and connected with said frame; inner walls 18 located toward opposite ends of the ship; forwardly and rearwardly converging plates 19 and 20, respectively, at opposite ends of the ship; and lateral partitions 21 within the confines of the walls 17 and extending longitudinally of the ship, these partitions being connected with the walls 18 and forming with the latter and the converging walls 19 and 20, compartments 22 and 23 at opposite ends of the ship, the compartment 24 at the central part of the ship being open at its top and bottom and containing the propelling mechanism hereinafter described.

In the construction illustrated, the ship is equipped at its top with main planes 25 and 26, which are preferably curved longitudinally and incline slightly downwardly toward the rear end thereof as illustrated, these planes being secured to the ship in fixed relation and supported above the body thereof on a frame comprising cross-beams 27 extending transversely of the main frame and uprights 28 rising therefrom, and intermediate ones of the uprights 28 being connected together by longitudinally-extending brace-beams 29. The ship is also equipped with a supplemental plane 30, which extends above the planes 25 and 26 intermediate the latter, and transversely of the ship, and is journaled at its opposite sides on a frame 31 of which the braces 29 form the lower members, this plane being preferably formed of a central supporting rock-shaft 32 equipped at intervals with cross-arms 33 and journaled in bearings 34 on the frame 31; and plane-sections 35 secured to the outer ends of the arms 33 at opposite sides of the shaft 32 and spaced therefrom so as to be centrally located with respect to its balance of atmospheric pressure, whereby the pressure of the air against the plane-sections 35 is so distributed relative to the axes upon which these plane-sections are adjustable, namely the shaft 32, that they may be easily swung upon their bearings to be adjusted to extend at any desired position relative to the planes 25 and 26, as hereinafter described.

At the rear end of the ship, at opposite sides thereof, are planes 36 which are of the same construction as the planes 30, the rock-shaft 37 upon which the planes 36 are supported extending through the compartment 23 and being journaled in bearings 38 and 39 on the walls 17 and 22, respectively, and a bearing 40 mounted between a pair of uprights 40ᵃ which extend upwardly from the lower inclined plate 20. The planes 36 are thus rendered adjustable with relation to the ship for a purpose hereinafter described, and as a convenient means for so adjusting the planes I provide a worm-gear (not shown) on the shaft 37 with which a worm 41 on a transverse hand-wheel-equipped shaft 42 journaled in the bearings 43 on the uprights 40ᵃ, meshes.

The rudder for guiding the ship in the desired path is illustrated at 44 and as shown is formed of a vertically-disposed blade 45 secured to the ends of a yoke 46 journaled in bearings 47 on the upper plate 20. The means illustrated for setting the rudder at different angles relative to the ship comprises a worm-gear-equipped shaft 48 journaled on an upright 49 in the forward compartment 22 of the ship, and in a bearing 50 in the adjacent wall 21, a hand-wheel-equipped worm 51 journaled in bearings 52 on the upright 49 and engaging with the worm-gear on the shaft 48, a sprocket 53 on the shaft 48, gear-mechanism 54 operatively connected with the yoke 46 and journaled in a bracket 55 on the upper inclined wall 20 adjacent to the rudder, a sprocket 56 connected with the gear-mechanism 54, and sprocket-chains 57 connecting the sprockets 53 and 56 together and running over idle-sprockets 58 journaled on a bracket 59 secured to the upper one of the plates 20.

The propelling-mechanism for the airship for driving it either upwardly or in any other desired direction is located in the compartment 24, and in the construction illustrated a pair of propelling devices are employed, though it is within my invention to use any other suitable number thereof as desired, the following being a description of the propelling mechanism shown.

Secured to the upper and lower girders 14 and 15 at opposite sides of the ship and within the confines of the walls 17 are vertically-disposed outwardly-bowed ribs 60 equipped with cross-beams 61 extending longitudinally of the ship and intermediate said girders, these cross-beams being provided with apertured brackets 62. Certain of the uprights 16 are connected together by cross-beams 63 which are located a slight distance above the beams 61 and are equipped with depending apertured brackets 64, the brackets 62 and 64 being so arranged as to present two sets of alining brackets as illustrated in Fig. 4. Each pair of brackets, which comprises a bracket 62 and a bracket 64, is connected together by a tube 65, the tubes 65 extending through their respective brackets and fixed thereto to be non-rotatable, and journaled on each tube 65 is a sleeve 66 carrying a sprocket-wheel 67. Each tube 65 contains a rotatable tube 68 which is connected with a rotatable sleeve 69, surrounding the coöperating tube 65, through the medium of a bolt 70 which passes through the sleeve 69 and a peripheral slot 71 in the tube 65 and screws into the inner tube 68 as illustrated of one of these four similar devices in Fig. 9, whereby the inner tubes 68 may, through the medium of sprocket-wheels 72 connected with the sleeves 69 and actuated as hereinafter described, be adjusted axially in the tubes 65 surrounding them for a purpose hereinafter explained. Each of the sleeves 66, which are in effect hubs of a rimless wheel, carries radially-extending spokes 73 rigidly secured to peripheral flanges 74 with which the sleeves 66 are equipped, those of the spokes 73 which oppose each other on opposite sides of the ship being connected together at their outer ends by means of cross-rods 73ª. Extending into the inner ends of each tube 68, and rigidly secured thereto, are cranks 75, the cranks at one side of the ship containing conduits 76 connecting with pipes 77 which lead, preferably, to separate sources of fluid under pressure and hereinafter referred to. Opposed cranks 75 are connected together at their inner ends, which are eccentric to the axes upon which these sleeves 68 are axially adjustable, by means of tubes 78, one for each set of cranks, the tubes 78 communicating with the respective conduits 76 in the cranks 75 (Fig. 10). Each tube 78 toward its opposite ends is surrounded by rotatable sleeves 79 located adjacent to the cranks 75 and provided with spaced peripheral flanges 80 (Fig. 11) and pivoted, as indicated at 81, to each set of the flanges 80 are rods 82 which serve to support cylinders 84 located between the companion rods 82. The cylinders 84, of which eight for each driving mechanism are provided in the construction illustrated and which correspond in number with the number of spokes 73, but the number of which, with the latter, may be varied as conditions require or render it expedient, are open at their inner ends and contain toward their outer ends partitions 85 through stuffing-boxes 86 in which the piston-rods 87 extend, it being preferred that each piston-rod 87 carry a cross-head 88 which slides on the adjacent rods 82 and that each piston-rod 87 be equipped with a pair of spaced piston-heads 89 and 90 located at opposite sides of the respective partitions 85. The piston-heads 90 which preferably contain inwardly-opening check-valves 91, coöperate with the outer open ends of the respective cylinders 84 for producing a dash-pot action in the inward movement of the piston-heads into the cylinders during the operation of the machine, as hereinafter described. The outer ends of the piston rods 87 are pivotally connected as indicated at 92 with curved planes, or vanes, 93 at opposite sides of the latter, these curved vanes being journaled at their forward edges 94 on the rods 73ª, the vanes 93 being of less width than the spaces between opposing spokes. It will be understood from the foregoing that in the construction illustrated four of the vanes 93 are provided on each propeller-mechanism and that each of the vanes 93 is connected toward its opposite sides with two of the piston and cylinder mechanisms described. Surrounding each tube 78 intermediate its ends is a rotatable head 95, forming a chest, which is internally chambered as illustrated at 96 and communicates with the interior of the tube 78, which it surrounds, through a port 97, stuffing-boxes 98 in the ends of the heads 95 serving to prevent the escape to the atmosphere of the fluid-pressure introduced into the tubes 78 as hereinafter described. Each of the heads 95 is equipped with a pair of pipes 99 which communicate with the chamber 96 through openings 100, the pipes 99 leading in opposite directions from the heads 95 equipped therewith and being provided at their opposite ends with branch-pipes 101 which communicate with the interiors of the adjacent cylinders 84 through the medium of flexible tubes 102, the pipes 99 being connected toward their ends with the adjacent ones of the sleeves 79 on which the cylinders 84 are pivotally mounted, whereby in the operation of the mechanism as hereinafter explained the cylinders 84, tubes 102, pipes 99 and heads 95 connected therewith rotate as a unitary structure upon the supporting tubes 78.

Located at any convenient point on the ship, as for example in the forward compartment 22 thereof, as illustrated, I provide a power-device 103, as for example an internal-combustion engine, which is geared to an air-pump 104 adapted to discharge into a pipe 105 which latter is connected with pipes 106 and 107 of a number corresponding to the number of propeller-mechanisms, in the construction illustrated there being two of these pipes. The pipes 106 and 107 open into air-tanks 108 and 109, respectively, into which the pipes 77 respectively lead, whereby each of the two companion sets of cylinders 84, consisting in the construction illustrated of eight cylinders each, are in communication with a separate source of fluid-pressure, the fluid-pressure in these cylinders being located between the partitions 85 and piston-heads 89.

It will be understood from the drawings and the foregoing description that the cylinders 84 are journaled on the pipes 78 which are eccentric to the axes upon which the spokes 73, carrying the pivoted vanes 93 coöperating with these cylinders, rotate (Fig. 8), and that said pipes are held stationary during the operation of the vanes 93, as hereinafter described, and are intended to be moved only for purposes of adjustment as hereinafter explained. As the propeller-mechanisms are rotated, as through the medium of sprocket-chains 110 connected with the sprockets 67 and with the sprockets 111 on rotatable shafts 112 journaled in bearings 113 on the ship and driven by sprocket-connections from the engine 103 and an engine 113ª in the compartment 23, the engagement of the vanes 93 with the air, when rotated in the direction indicated by the arrow in Fig. 8, tends to compel them to move in a circular path of rotation. The vanes 93, however, being connected with the pistons 89, and these pistons being subjected to the fluid-pressure in the cylinders 84, which latter revolve about an axis eccentric to the axes about which the vanes 93 revolve, causes the pistons 89 to pull the vanes 93 toward their axes, drawing them from a truly circular path, relatively downward, and causing them to displace the air while they are moving in the upper part of their path of movement.

In pulling the vanes 93 downward the pistons 89 depend for their power on the fluid-pressure in the cylinders 84. This fluid-pressure must have an expansive force sufficient to elevate that portion of the weight each of the propeller mechanisms is required to lift, and the speed at which the pistons 89 are capable of pulling the vanes 93 downward is restricted to the power of this fluid-pressure to displace a given quantity of air per second. Consequently, by rotating the propeller mechanism at a high rate of speed, the pistons 89 will be unable to pull the vanes 93 downward and displace air at a corresponding rate of speed, with the result that the cylinders 84 and vanes 93 recede from each other as they move toward the point of greatest eccentrical difference in their paths, thereby causing the pistons 89 to relatively move upward in the cylinders 84 and displace the fluid-pressure in the latter. This relative upward movement of the pistons 89 with relation to the cylinders 84 continues until the tension of the fluid-pressure against the pistons and partitions 85 in the cylinders overcomes the inertia of the ship, and forces the cylinders 84, and consequently the ship, upward at a speed in excess of the downward speed of the vanes 93.

It will be understood from the foregoing that in the intervals between the initial engagement of the vanes 93 with the air, and the overcoming of the inertia of the ship as described, the latter is sustained by the reactionary force of the air against the vanes 93, this being due to the utilization, by the fluid-pressure in the cylinders 84, of the inertia of the ship as resistance to upward movement, thereby enabling the fluid-pressure to develop a fulcrum of sufficient sustaining power to overcome the downward pull of the ship.

As the vanes 93 are successively moved in engagement with the air and through that portion of their path in which they are caused to be moved downward against the air and operate in conjunction with said fluid-pressure mechanism as described, each of said vanes operates to produce lifting of the body of the ship and thus the latter, by rapidly rotating the vanes 93, may be driven through the air with approximately uniform velocity.

It will be manifest that by varying the pressure of the air introduced into the cylinders 84, the reaction thereof against the body of the ship as described may be varied for varying the distance and speed at which the body is moved at each impulse created by one of the planes 93 engaging with the air as described, or, if desired, the air-pressure may be reduced to such a degree as to cause the reactive force of the air in the cylinders to be of the same, or approximately the same, or of less degree than the resistance afforded by the ship, and thus the ship may be caused, under the control of the operator, to be held substantially at a given level or be allowed to descend at any speed desired. In order to provide for the supply of fluid-pressure to the cylinders 84 as stated, I provide in the pipes 106 and 107 manually-controlled valves 115 and 116, respectively, for controlling the flow of fluid-pressure from the pipe 105 into the respective pipes 106 and 107, and also provide in these last referred to pipes hand-controlled outlet-valves 117 and 118, respectively. By manipulating the valves 115 and 116, the flow of fluid-pressure to either or both, of the tanks 108 and 109 may be arrested, and by opening either of the valves 117 and 118 the pressure in either of these tanks may be decreased to the desired degree independently of each other, whereby the propeller-mechanisms may be caused to exert the same, or substantially the same, lifting power upon the air-ship, or unequal lifting power as desired, which thus permits the operator to maintain the ship in a level position when the weight carried by the latter is unequally distributed.

It is preferred that the air-pump 104 be continuously operated and that the tanks 108 and 109 be of such capacities relative to the cylinders which they supply as not to cause the pressure in the tanks, and the respective cylinders supplied therefrom, to be substantially increased when the pistons 89 move toward the partitions 85. Thus the pistons 89 move in the cylinders 84 against substantially the same pressure throughout their movement in these cylinders, whereby the maximum efficiency of these piston and cylinder mechanisms is obtained, and relatively short cylinders 84 may be used. The piston-heads 90 moving into the cylinders 84 serve to retard the relative movements of the piston-heads and cylinders, at the final portion of their movement and thus prevent objectionable jar of the mechanism, the provision of the valves 91 in the piston-heads 90 serving to insure the proper amount of air in the open ends of the cylinders by preventing suction action when the heads 90 move outward from the cylinders 84.

When the air-compressor 104 is operated continuously, I provide in the pipe 105 a relief-valve 127 which is preferably adjustable for varying the degree of air-pressure supplied to the pipes 106 and 107. In the construction illustrated, the required adjustment is provided for by providing a vented cap 128 which has threaded connection with the upper end of the valve-casing 129 and is adjustable up and down thereon, the spring represented at 130 for yieldingly holding the valve 131 to its seat 132 in the casing 129, surrounding the valve-stem 133 and bearing against a washer 134 fitting against a stop-pin 134ª on the stem 133 and against the underside of the cap 128. Thus the tension of the spring 130, and consequently the air-pressure in the pipes 106 and 107, may be varied as desired by screwing the cap 128 up or down on the casing 129.

In the drawings, I have illustrated the piston and cylinder mechanisms correctly positioned, as regards their eccentric relation to the axes upon which the members 66 rotate, for lifting the air-ship. It will be noted, however, from the foregoing description, that the crank 75, and the parts carried thereby, are adjustable axially about the axes about which these sleeves rotate, and by adjusting these cranks as described, as by swinging them to the right and upwardly in Fig. 8, the vanes 93 are caused to operate against the air throughout such a portion of their travel as to cause them to exert a pull upon the body of the air-ship at an angle to the vertical, and thus through the medium of the piston and cylinder mechanisms as described the ship may be propelled in a path extending at an angle to the vertical. Any suitable means may be provided for adjusting the cranks 75 as stated, the means illustrated comprising a worm-gear-equipped shaft 119, journaled in bearings 120 in the walls 21 and equipped with sprockets 121 and 122 which are connected through the medium of sprocket-chains 123 with the sprockets 72, the shaft 119 being rotatable through the medium of a worm-gear 124 fixed on a hand-wheel equipped shaft 125 journaled in bearings 126 supported on the upright 49.

The plane 30 is adapted to be set at any angle desired with relation to the planes 25 and 26 through the medium of a worm-gear-equipped shaft 135 journaled in bearings 135ª in the walls 21, the worm-gear 135ᵇ on this shaft meshing with a worm-gear 136 fixed on a shaft 137 equipped with a hand-wheel 137ª and journaled in bearings 138 on the upright 49, the shaft 135 carrying sprockets 139 which connect, through the medium of sprocket-chains 140, with sprockets 141, the latter being connected with sprockets 142 which connect through the medium of sprocket-chains 143 with sprockets 144 carried by the shaft 32 toward its opposite ends.

The planes 25 and 26 serve as sustaining planes operating in connection with the propelling mechanism, when the ship is propelled at an angle to the vertical, and are preferably fixed relative to the body of the ship, whereas the planes 30 being adjustable serve as a means for maintaining a certain altitude during the horizontal movement of the ship under varying speeds by controlling the amount of displacement of the air, it being preferred that the planes 25 and 26, as well as the planes 30 and 36 and vanes 93 present a corrugated under surface, as represented, for presenting to the air the maximum amount of surface commensurate with their dimensions, thus obtaining a high degree of efficiency therefrom, the corrugations being preferably so shaped as to cause their adjacent surfaces to extend at an angle to each other of 90°, or more.

Various attempts have been made to accomplish the balancing of air-ships by the use of fixed planes set at an angle to the vertical, but such attempts have failed because of the fact that the planes were not set at the proper angle and thus oscillation of the ship in the air resulted.

I have discovered that a plane operated so as to displace air into the upper or lower vertical quarters, namely upwardly or downwardly, respectively, at the angle not less than 45° to the horizontal plane, thereby operates against the natural compression of the atmosphere and develops a greater resistance than would a plane operated so as to displace air into the horizontal quarter, namely at an angle not less than 45° to the vertical plane, and in providing for the balancing of my air-ship I utilize the above-stated principle as hereinafter described.

To provide for the righting of the ship lengthwise, I provide the converging plates 19 and the planes 36, the plates 19 converging at an angle to each other of about 90°, preferably slightly more than 90°, and at equal angles to the horizontal plane, and for correcting the tilting of the ship sidewise, I provide at the sides thereof equalizing planes 145 which extend substantially longitudinally of the machine at opposite sides thereof, and are supported from the central ones of the uprights 28 which latter are preferably extended downward sufficiently far to connect with the lower edges of these planes. Each of these planes is preferably formed of sections 146 and 147 which converge laterally to a meeting edge and extend with relation to each other at substantially a 90° angle, preferably slightly more than 90,° but all of these plane-sections extending at the same angle to the horizontal. These plane-sections taper from their rear to their front edges and are so positioned on the ship as to cause their meeting edges to converge toward the front end of the machine, whereby the plane-sections 146 and 147 not only are disposed at angles to the body of the ship in a vertical plane, but also in a horizontal plane.

When the ship is traveling through the air in level condition, the converging plates 19 and the plane-sections 146 and 147 tend to displace the air substantially equally into the horizontal quarter, and thus the resistance of the air against the opposing planes 19 is equalized. Should, however, the ship tilt lengthwise, as for example, downwardly at its forward end, the angles at which the plates would extend with respect to the horizontal level would become changed, causing the lower plate 19 to displace air into the lower vertical quarter, and the upper plate 19 to displace air into the horizontal quarter, with the result that the lower plate 19 by displacing air into the vertical quarter would develop a greater atmospheric resistance than the upper plate 19 would be able to develop by displacing air into the horizontal quarter. Thus a lifting force would be developed against the lower plate 19 and force the prow of the ship back to a level position. The depressing of the stern of the ship to aid in the righting thereof, when tilted as described, is effected by the operator adjusting the planes 36 by the mechanism described to cause them to incline upwardly from front to rear at the desired angle, whereupon the ship will be brought to an even, or substantially even, keel, lengthwise thereof.

It will be understood from the foregoing that should the ship tilt upwardly at its forward end, the upper plate 19 would then displace air into the upper vertical quarter and the lower plate 19 would displace air into the horizontal quarter, with the result that the upper plate 19 would develop a greater atmospheric resistance than the lower plate 19 and consequently the prow of the ship would be forced down to a level position.

The general principle of operation described of the plates 19 is involved in the operation of the planes 145, and thus should the ship while moving horizontally tilt to the right, viewing it from the stern end thereof, the angle of the planes 146 and 147 at both sides of the ship would be changed with respect to the horizontal level, with the result of causing the upper plane 147 at the left-hand side of the ship to displace the air into the upper vertical quarter while its lower, companion, plane 146 displaces the air into the horizontal quarter, and the converse is true of the planes 146 and 147 at the opposite side of the ship. Thus the last referred to top plane 147 displaces the air into the horizontal quarter, while its lower, companion, plane 146 displaces the air into the lower vertical quarter, which thus causes the planes displacing the air into the upper and lower vertical quarters to develop a greater resistance than their companion planes displacing air into the horizontal quarters are capable of developing, with the result of forcing the ship back to a level position. It will be understood from the foregoing description of the operation of the planes 146 and 147 when the ship tilts to the right, that righting of the ship when it tilts to the left, will be effected by the action of these planes operating conversely to that just described.

While I prefer to employ companion converging planes at the sides of the ship operating to render it stable, it is within my invention to employ single planes at the sides thereof in lieu of the double planes described, provided the planes be set at substantially a 45° angle to the vertical, for the reason made manifest by the foregoing description of the converging planes 146 and 147.

The adjacent surfaces of the corrugated planes extend with relation to each other at an angle of 90° or more, in order that the reactionary force of the air displaced thereby will be developed and exerted in the vertical quarter and thus the maximum efficiency of the planes will be obtained.

If desired, the spokes 73 may be provided with vanes 148 set at such an angle to the path through which the spokes 73 rotate, as to cause the air to be forced inwardly into the spaces between opposing spokes and into the path of movement of the vanes 93, and thus the effectiveness of the vanes 93 in operating against the air is augmented. Furthermore, deflectors 149 may be provided on the ship for deflecting air into the compartment 24 and into the paths of movement of the vanes 93 to further augment the effectiveness of the vanes 93, the vanes 149 being secured, in spaced relation, on the frame of the body of the ship at its top to extend transversely thereof.

While I have illustrated and described pivotally-supported planes which operate as the air-engaging devices driving the ship in any direction, it will be understood that my invention as to the feature of providing the piston and cylinder mechanisms may be utilized in connection with any other form of revoluble air-gripping devices, as for example the ordinary form of propeller-wheels, or, in fact, any other form of air-engaging device. Furthermore, the construction illustrated may be otherwise variously modified, or altered, without departing from the spirit of my invention.

What I claim as new and desire to secure by Letters Patent is—

1. In an air-ship, the combination of a support, air-engaging means supported on the ship and movable relative to the latter, means for actuating said air-engaging means, and fluid-compression mechanism comprising piston and headed-cylinder members, one of which is connected with said air-engaging means and the other with said support, and operating, when said air-engaging means are operating against the air, to cause said air-engaging means to be moved, relative to the ship, against the air as a fulcrum for lifting the ship.

2. In an air-ship, the combination of a support, air-engaging means supported on the ship to revolve thereon and movable toward the axis about which they revolve, means for revolving said air-engaging means, and fluid-compression mechanism comprising piston and headed-cylinder members, one of which is connected with said air-engaging means and the other with said support, and operating, when said air-engaging means are actuated, to move the latter, while operating against the air, toward the axis about which they revolve, for the purpose set forth.

3. In an air-ship, the combination of a support, air-engaging means supported on the ship and movable relative to the latter, means for actuating said air-engaging means, fluid-compression mechanism comprising piston and headed-cylinder members one of which is connected with said air-engaging means and the other of which is connected with said support, and means operating to cause one of said members to move relative to the other member thereof and against the pressure of the fluid in the cylinder for moving said air-engaging means relative to the ship during the actuation of said air-engaging means, for the purpose set forth.

4. In an air-ship, the combination of a support, air-engaging means supported on the ship to revolve thereon and movable toward the axis upon which they revolve, means for revolving said air-engaging means, and fluid-compression mechanism comprising piston and headed-cylinder members one of which is connected with said air-engaging means and the other of which is connected with said support, the one of said members which is connected with said support being so positioned as to cause said air-engaging means to be moved toward the axis upon which the latter revolve, under the pressure of the fluid in said cylinder, while said air-engaging means are being revolved against the air, for the purpose set forth.

5. In an air-ship, the combination of a support, air-engaging means supported on the ship to revolve thereon and movable toward the axis upon which said means revolve, means for revolving said air-engaging means, and fluid-compression mechanism comprising piston and headed-cylinder members one of which is connected with said air-engaging means and the other of which is connected with said support, eccentrically of said axis, the whole being constructed and arranged to cause said air-engaging means to be moved, under the action of the fluid-pressure in said cylinder, toward the axis about which said air-engaging means revolve, for the purpose set forth.

6. In an air-ship, the combination of a support, air-engaging means supported on the ship to revolve thereon and movable toward the axis about which they revolve, means for revolving said air-engaging means, and fluid-compression mechanism comprising piston and headed-cylinder members one of which is connected with said air-engaging means and the other of which is connected with said support eccentrically of said axis, the connection between said support and the said member connected thereto being adjustable for varying the position of said last referred to member eccentrically about said axis, for the purpose set forth.

7. In an air-ship, the combination of a support, an air-engaging vane supported on the ship to revolve thereon and movable toward the axis about which it revolves, means for revolving said vane, and fluid-compression mechanism comprising piston and headed-cylinder members, one of which is connected with said vane and the other with said support, and operating, when said vane is revolved against the air, to cause said vane to be moved relative to the ship against the air as a fulcrum for lifting the ship.

8. In an air-ship, the combination of a member journaled on the ship to rotate thereon, an air-engaging vane pivotally connected with said member, means for rotating said member, and fluid-compression mechanism comprising piston and headed-cylinder members, one of which is connected with said vane and the other of which is connected with the ship and operating, when said vane is being revolved against the air, to cause said vane to be moved, relative to the ship, against the air as a fulcrum for lifting the ship.

9. In an air-ship, the combination of a support, air-engaging means supported on the ship and movable relative to the latter, means for actuating said air-engaging means, fluid-pressure piston-and-cylinder mechanism connected with said air-engaging means, and means for supplying fluid-pressure to said cylinder, said piston-and-cylinder mechanism operating, when said air-engaging means are operating against the air, to cause said air-engaging means to be moved relative to the ship against the air as a fulcrum for lifting the ship.

10. In an air-ship, the combination of a support, air-engaging means supported on the ship and movable relative to the latter, means for actuating said air-engaging means, fluid-pressure mechanism comprising piston and cylinder members one of which is connected with said air-engaging means and the other of which is connected with said support, means operating to cause one of said members to move relative to the other member thereof against the pressure of the fluid in the cylinder to cause said air-engaging means to move, relative to the ship, against the air as a fulcrum for lifting the ship, and means for supplying fluid-pressure to said cylinder, for the purpose set forth.

11. In an air-ship, the combination of a support, air-engaging means supported on the ship and movable relative to the latter, means for actuating said air-engaging means, fluid-pressure piston-and-cylinder mechanism connected with said air-engaging means and with said support and operating, when said air-engaging means are operating against the air, to cause said air-engaging means to be moved, relative to the ship, against the air as a fulcrum for lifting the ship, and means operating to maintain substantially uniform pressure in said cylinder throughout the operation of said fluid-pressure mechanism.

12. In an air-ship, the combination of a support, air-engaging means supported on the ship and movable relative to the latter, means for actuating said air-engaging means, fluid-pressure piston-and-cylinder mechanism connected with said air-engaging means and with said support and operating, when said air-engaging means are operating against the air, to cause said air-engaging means to be moved, relative to the ship, against the air as a fulcrum for lifting the ship, and a reservoir containing fluid-pressure and in open communication with said cylinder, said reservoir being of such capacity, relative to said cylinder, as to cause the pressure in said cylinder to be maintained substantially uniform throughout the operation of said fluid-pressure mechanism.

13. In an air-ship, the combination of a support, air-engaging means supported on the ship and movable relative thereto, means for actuating said air-engaging means, and fluid-compression mechanism comprising a piston and a headed-cylinder connected, respectively, with said air-engaging means and with said support and operating, when said air-engaging means are actuated, to cause said air-engaging means to be moved, under the action of the fluid-pressure in said cylinder, relative to the ship against the air, as a fulcrum, for lifting the ship.

14. In an air-ship, the combination of a support, air-engaging means supported on the ship to revolve thereon and movable toward the axis about which they revolve, means for revolving said air-engaging means, and fluid-compression mechanism comprising a headed-cylinder and a piston connected, respectively, with said support and with said air-engaging means and operating, under the action of the fluid-pressure in said cylinder, to cause said air-engaging means to move toward the axis about which they revolve, for the purpose set forth.

15. In an air-ship, the combination of a support, air-engaging means supported on the ship to be revolved thereon and movable toward the axis about which they revolve, means for revolving said air-engaging means, a cylinder connected with said support eccentrically of the axis about which said air-engaging means revolve and equipped with a head, and a piston in said cylinder and connected with said air-engaging means for operating against fluid-pressure in said cylinder between said piston and head, while said air-engaging means are revolving, for the purpose set forth.

16. In an air-ship, the combination of a support, air-engaging means supported on the ship to revolve thereon and movable toward the axis about which they revolve, means for revolving said air-engaging means, a cylinder adjustably connected with said support eccentrically of the axis about which said air-engaging means revolve and equipped with a head, and a piston in said cylinder connected with said air-engaging means and operating against fluid-pressure in said cylinder between said piston and head while said air-engaging means are being revolved, for the purpose set forth.

17. In an air-ship, the combination of a support, air-engaging means supported on the ship to be revolved thereon, and movable toward the axis about which they revolve, means for revolving said air-engaging means, a fluid-pressure cylinder connected with said support eccentrically of the axis about which said air-engaging means revolve and containing a partition, and a piston in said cylinder connected with said air-engaging means and between which latter and said piston said partition extends, whereby said piston operates against fluid-pressure in said cylinder, for the purpose set forth.

18. In an air-ship, the combination of a support containing a passage adapted to be connected with a source of fluid-pressure supply, air-engaging means supported on the ship to revolve thereon and movable toward the axis about which they revolve, means for revolving said air-engaging means, a fluid-pressure chest rotatably mounted on said support and in open communication therewith, a fluid-pressure cylinder journaled on said support eccentrically of the axis about which said air-engaging means revolve, means connecting the interior of said cylinder with said chest, and a piston in said cylinder connected with said air-engaging means and against which the fluid-pressure in said cylinder operates, for the purpose set forth.

19. In an air-ship, the combination of a member rotatably supported on the ship, means for rotating said member, vanes supported on said member and movable thereon toward the axis about which said member rotates, and fluid-compression mechanism for each of said vanes, each of said mechanisms comprising piston and headed cylinder members, one of each of which is connected with said vanes and the other of which is connected with the ship eccentrically of the axis about which said member rotates, for the purpose set forth.

20. In an air-ship, the combination of a member rotatably supported on the ship, means for rotating said member, vanes supported on said member and movable toward the axis about which the latter rotates, a support on the ship, and fluid-compression mechanism for each of said vanes, each of said mechanisms comprising a piston and a headed-cylinder, said pistons being connected with said vanes and said cylinders being grouped about and journaled on said support eccentrically of the axis about which said member rotates, for the purpose set forth.

21. In an air-ship, the combination of a member rotatably supported on the ship, means for rotating said member, a curved vane supported on said member and movable toward the axis about which the latter rotates, and fluid-compression mechanism comprising piston and headed-cylinder members, one of which is connected with said vane and the other with the ship, and operating, when said vane is being revolved against the air, to cause said vane to be moved toward the axis about which said member rotates, for the purpose set forth.

22. In an air-ship, the combination of a support, air-engaging means supported on the ship to revolve thereon and movable toward the axis about which they revolve, means for revolving said air-engaging means, a fluid-pressure cylinder connected with said support eccentrically of the axis about which said air-engaging means revolve and provided with a head, a piston in said cylinder connected with said air-engaging means, and cushioning-means coöperating with said air-engaging means, for the purpose set forth.

23. In an air-ship, the combination of a support, air-engaging means supported on the ship to revolve thereon and movable toward the axis about which they revolve, means for revolving said air-engaging means, a fluid-pressure cylinder connected with said support eccentrically of the axis about which said air-engaging means revolve, a piston in said cylinder connected with said air-engaging means, and dash-pot mechanism coöperating with said air-engaging means and operating as a cushion, for the purpose set forth.

24. In an air-ship, the combination of a support, air-engaging means supported on said ship to revolve thereon and movable toward the axis about which they revolve, means for revolving said air-engaging means, a cylinder connected with said support eccentrically of the axis about which said air-engaging means revolve, a piston in said cylinder connected with said air-engaging means, a partition in said cylinder interposed between said piston and said air-engaging means and through which the stem of the piston moves, means for supplying fluid-pressure to said cylinder into the space between said partition and the head of said piston, and a dash-pot piston carried by the piston-stem and operating in said cylinder, beyond said partition therein, for the purpose set forth.

25. In an air-ship, the combination of a rotatable support on the ship, a series of vanes pivotally connected with said support, a rotatable member supported eccentrically of the axis about which said support rotates, cylinders grouped about and connected with said member, and pistons in said cylinders connected with said vanes eccentrically of the pivotal connections of the latter with said rotatable support.

26. In an air-ship, the combination of a member rotatably supported on the ship, means for rotating said member, vanes on said member and movable toward the axis about which the latter rotates, fluid-pressure piston-and-cylinder mechanism located adjacent to the opposite sides of said vanes, a relatively stationary tube adapted to be connected with a source of fluid-pressure supply and supported eccentrically of the axis about which said member rotates, said cylinders being grouped about and rotatably mounted on said tube and said pistons being connected with said vanes, and a fluid-pressure chest surrounding said tube and opening into the latter and into the interior of said cylinders, for the purpose set forth.

27. In an air-ship, the combination of a member rotatably mounted on the ship, means for rotating said member, vanes on said member and movable thereon toward the axis about which said member rotates, fluid-pressure piston and cylinder mechanism for moving said vanes toward said axis, the piston of said mechanisms being connected with said vanes, relatively nonmovable tubes supported eccentrically of the axis about which said member rotates and upon which the cylinders are supported to revolve with said vanes, the ends of said cylinders between which and the heads of said piston-heads the fluid-pressure is introduced being interposed between said piston-heads and vanes, a fluid-pressure chest journaled on said tube and in communication therewith and with said cylinders between said cylinder-ends and said piston-heads, and means for supplying fluid-pressure to said tubes, for the purpose set forth.

28. In an air-ship, the combination of air-engaging means on the ship, means for driving said air-engaging means against the air, means for moving said air-engaging means relative to the ship while being driven against the air, and fluid-pressure means coöperating with said air-engaging means and with said third-named means for momentarily storing the force which is exerted, in opposition to the inertia of the ship, by said air-engaging means in operating against the air and being moved bodily with relation to the ship, and exerting upon the ship the force so stored to overcome the inertia therein and move it with relation to said air-engaging means while the latter are operating against the air.

29. In an air-ship, the combination of its body, a rotatable support carried by said body, a series of air-engaging vanes carried by said support and serving, when the latter is rotated, to operate against the air, and fluid-compression mechanisms each comprising piston and headed-cylinder members, one member of each of said mechanisms being connected with said body and the other with said vanes, said mechanisms operating to move said vanes radially of the axis on which said support rotates while the latter is rotating during the engagement of said vanes with the air, to cause the latter to act against the air as a fulcrum.

30. In an air-ship, the combination of a support, air-engaging means supported on the ship and movable relative to the latter, means for actuating said air-engaging means, fluid-pressure piston-and-cylinder mechanism connected with said means and with said support and operating, when said air-engaging means are operating against the air, to cause said air-engaging means to be moved relative to the ship against the air as a fulcrum for lifting the ship, and means for varying the pressure in said cylinder, for the purpose set forth.

31. In an air-ship, the combination of a support, air-engaging means supported on the ship and movable relative to the latter, means for actuating said air-engaging means, fluid-pressure piston-and-cylinder mechanism connected with said means and with said support and operating, when said air-engaging means are operating against the air, to cause said air-engaging means to be moved relative to the ship against the air as a fulcrum for lifting the ship, and an air-pump operating to supply fluid-pressure to said mechanism, for the purpose set forth.

32. An air-ship formed with a compartment closed at its sides but open at its top and bottom and propelling mechanism operating in a vertical plane located in said compartment, the housing of said propelling-mechanism inclosing it laterally only, and the open top and bottom thereof permitting free and unrestricted passage of air to said mechanism and the discharge of the air downwardly from said housing.

33. An air-ship formed with cabin-compartments at its opposite ends and with an intermediate compartment open at its top and bottom and propelling-mechanism located in said intermediate compartment and operating in a vertical plane, said intermediate compartment housing said mechanism laterally only and providing unobstructed passage for air to and from said mechanism.

DANIEL P. McLAUGHLIN.

In presence of—
R. A. SCHAEFER,
JOHN WILSON.